No. 761,027. PATENTED MAY 24, 1904.
J. E. BIELER.
SINGLE ROW CULTIVATOR.
APPLICATION FILED JAN. 2, 1903.
NO MODEL. 2 SHEETS—SHEET 1.
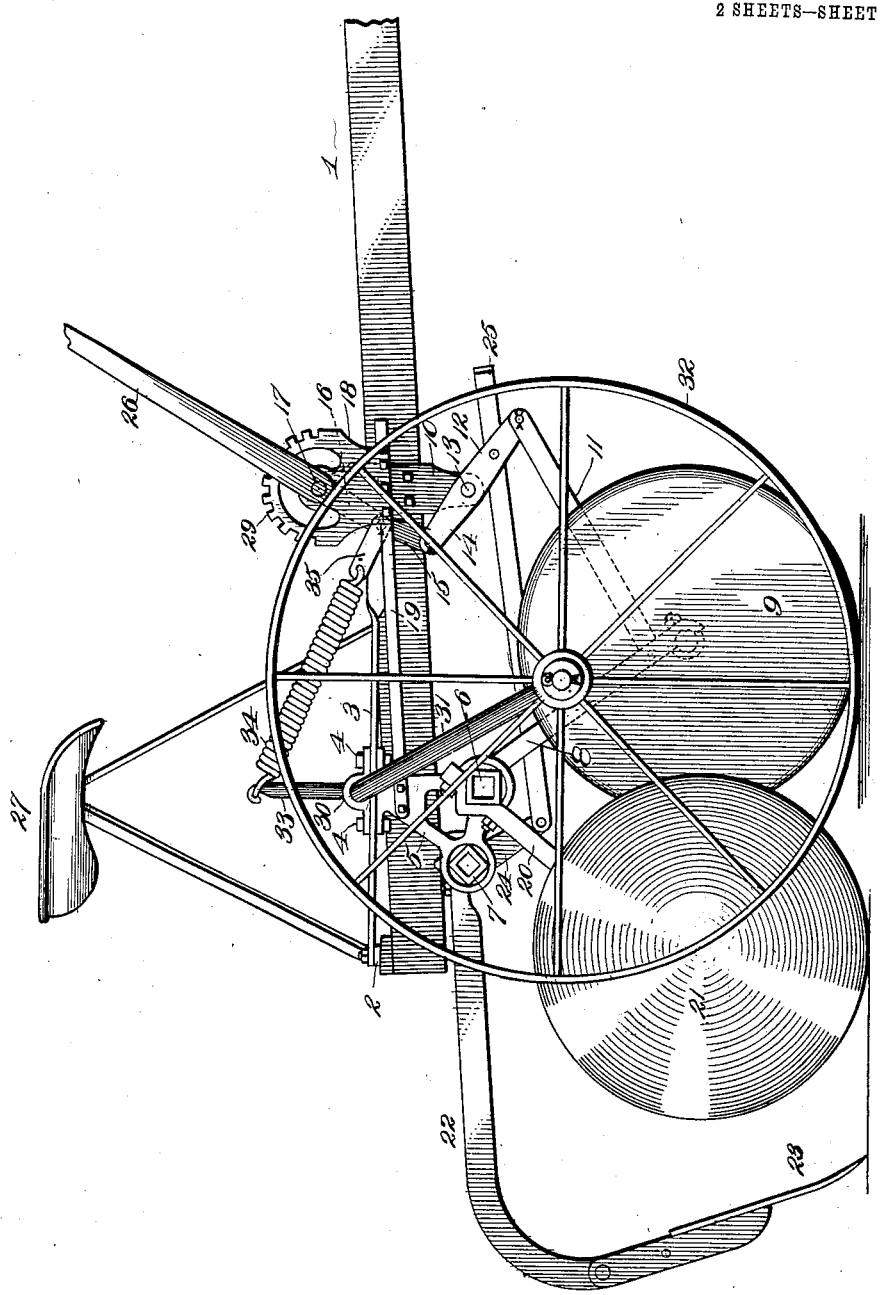

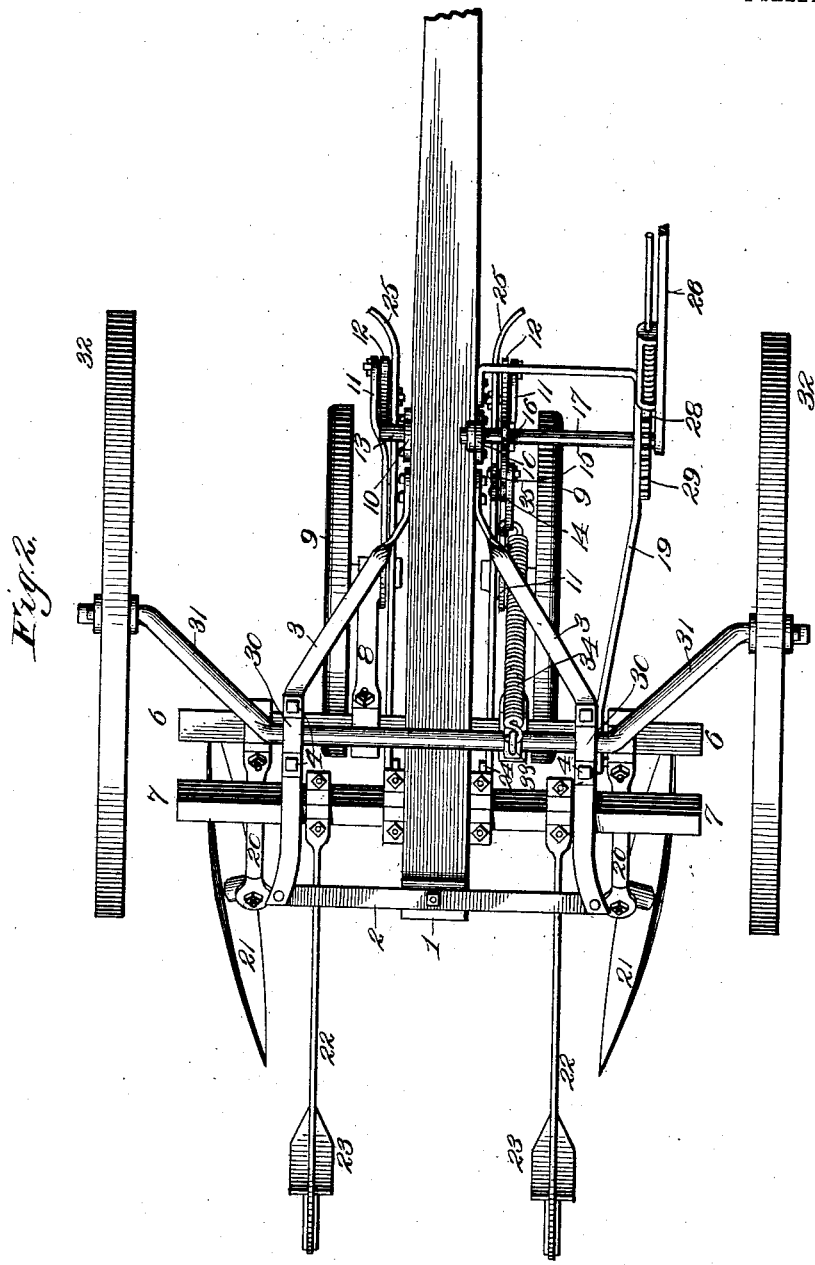

No. 761,027. Patented May 24, 1904.

UNITED STATES PATENT OFFICE.

JOHN E. BIELER, OF BLUE RAPIDS, KANSAS, ASSIGNOR TO HERMAN S. SWANSON, OF BLUE RAPIDS, KANSAS.

SINGLE-ROW CULTIVATOR.

SPECIFICATION forming part of Letters Patent No. 761,027, dated May 24, 1904.

Application filed January 2, 1903. Serial No. 137,612. (No model.)

*To all whom it may concern:*

Be it known that I, JOHN E. BIELER, a citizen of the United States, residing at Blue Rapids, in the county of Marshall and State of Kansas, have invented certain new and useful Improvements in Single-Row Cultivators, of which the following is a specification.

My invention relates to single-row cultivators; and my object is to produce an attachment capable of use in connection with one of the gangs of a straddle-row machine to constitute a single-row cultivator which cannot upset and in which the cultivating appliances maintain their operative position with relation to the ground without regard to the character of its surface.

To this end the invention consists in certain novel and peculiar features of construction and organization, as hereinafter described and claimed; and in order that it may be fully understood reference is to be had to the accompanying drawings, in which—

Figure 1 represents a side elevation of a straddle-row cultivator-gang as equipped with my attachment so as to constitute a single-row machine. Fig. 2 is a plan view of the same.

The type of straddle-row gang which I prefer to use in conjunction with my attachment is that shown in the patent for cultivator, No. 723,422, issued to C. L. Swanson March 24, 1903, and it is to be understood that I consider the use of the same or any equivalent thereof in conjunction with the attachment as properly falling within the spirit and scope of my invention.

Referring first to the description of the gang, 1 designates the tongue, equipped with a rigid frame at its upper side and rear end. This frame preferably comprises the transverse bar 2 and the obtuse-angle-shaped bars 3, connecting the ends of bar 2 with the tongue. The frame described is preferably substituted for the circle of the structure shown in the aforesaid patent, though it is to be understood that a circle may be used, if desired.

Secured by bolts 4 to and pendent from angle-bars 3 are the brackets 5, forming bearings for the transverse rocker-shafts 6 and 7, said rocker-shafts being preferably rectangular in cross-section.

Secured at their upper ends to shaft 6 are arms 8, carrying ground-wheels 9 at their lower ends, and connecting said arms with the rigid plates 10, depending from the tongue, are toggle-joints, the same comprising the links 11 and the crank-arms 12 of the short shaft 13, journaled in said plates, and said shaft is provided with an arm 14, projecting rearwardly or in the opposite direction from gang-arms 12 and forming practically a continuation of one of the crank-arms 12. The arm 14 is connected by a link 15 to the depending crank 16 of the shaft 17, said shaft being journaled at one end in a bracket 18, carried by an angle-brace 19, connecting one of the brackets 5 with the tongue and at its opposite end in one of the plates 10.

20 designates arms rigidly secured at their upper ends to rocker-shaft 6 and diverging downwardly with relation to arms 8, and carried by said arms 20 are the usual cultivating-disks 21. Mounted rigidly upon the rocker-shaft 7 are cultivator-beams 22, equipped with shafts 23, rearwardly of and adapted to travel inward and outward of the furrows made by the disks, according to the adjustment of said beams on shaft 7.

Depending rigidly from rocker-shaft 7 are crank-arms 24, connected by links 25 to crank-arms 12, and forming in conjunction therewith toggle-joints between arms 24 and plates 10, and in order that the various toggle-joints may be simultaneously expanded or contracted a lever 26 is mounted on shaft 17 within convenient reach of the driver when upon seat 27, supported from the gang-frame, as shown, or in any other suitable or preferred manner, and said lever is equipped with the usual spring-actuated dog 28 for engagement with the sector 29. By withdrawing the dog from the sector the draft-animals hitched to the tongue are enabled to pull the tongue and rocker-shafts almost vertically over the ground-wheels, the result being the cultivating appliances are elevated to inoperative position. If desired, the driver may effect the same result by withdrawing said dog and pulling said lever rearwardly. By so doing he expands the toggle and in effect pushes the ground-wheels back under rocker-shaft 6.

Referring now especially to my attachment, 30 represents bearings secured upon bars 3 by the bolts 4, and journaled therein is an arched axle 31, carrying wheels 32, being journaled upon the ends of the axle. The latter is provided contiguous to the tongue with an upwardly-projecting arm 33, the upper end of which a retractile spring 34 connects with a link 35, pivotally united at its opposite end to crank-arm 16 at the point of connection of the latter with link 15, the arrangement being such that the operation of said lever shall either increase or decrease the tension on said spring, the latter holding the carrying-wheels with a yielding pressure upon the ground and tending to move rearwardly.

In practical operation it will be apparent from the structure described that the carrying-wheels are free to ride over obstructions in the surface of the ground without raising the cultivating appliances with them, the spring yielding under the resistance toward upward movement offered by the cultivating appliances under the circumstances mentioned. It is likewise evident that the carrying-wheels can roll down into a hollow without any tendency toward forcing the cultivating appliances deeper into the soil. The principal function of the attachment is to provide a light and practical means for preventing the cultivating appliances from upsetting and for holding them in their proper relation to the ground instead of tilting sidewise with every little irregularity in the surface of the ground. The carrying-wheels enable the machine to be turned easily and quickly at any time without danger of upsetting.

It will be noted that when the machine is at work, and therefore when there is the least danger of it upsetting, the lever 26 is thrown forward and removes part of the tension from the spring, so as to allow the wheels 32 to easily accommodate themselves to obstructions, whereas when the cultivator appliances are raised from the ground by throwing the lever rearwardly to balance them on the ground-wheels, and therefore in the greatest danger of upsetting, the tension on the spring is the greatest, and in consequence the pressure of the wheels upon the ground is proportionately increased, and therefore eliminates any possibility of the machine upsetting.

From the above description it will be apparent that I have produced an attachment which may be easily applied without skilled labor to a gang of any of the approved types of straddle-row cultivators and that a purchaser of a straddle-row cultivator and one of my attachments is equipped with two complete cultivators, one a single-row and the other a straddle-row cultivator, and it will be apparent that various modifications in the detail construction and arrangement and proportion of the parts may be made by any mechanic skilled in the art to which the invention appertains.

Having thus described the invention, what I claim as new, and desire to secure by Letters Patent, is—

1. The combination with a tongue, a frame thereon, brackets carried by the frame, cultivating appliances supported from said brackets, and ground-wheels also supported from said brackets, of connected crank-arms suitably supported, wheels journaled on the outer ends of said crank-arms, and means tending to yieldingly throw said crank-arms to a vertical position.

2. The combination with a tongue, a frame thereon brackets carried by the frame, cultivating appliances supported from said brackets, and ground-wheels also supported from said brackets, of an arched axle journaled on said frame and having its arms depending and terminating in outturned ends, wheels journaled on said ends of the axle, and a spring connected to the axle and tending to throw said arms to a vertical position.

3. The combination with a tongue, a frame thereon, brackets carried by the frame, cultivating appliances supported from said brackets, and ground-wheels also supported from said brackets, of an arched axle journaled on said frame and having its arms depending and terminating in outturned ends, wheels journaled on said ends of the axle, a crank-arm projecting from the axle, and a spring connected to the crank-arm and tending to swing said arms to a vertical position.

4. The combination of a tongue, a frame thereon, an arched axle journaled on said frame and having its ends depending and provided also with a crank-arm, wheels journaled on said depending ends, a lever, and means to lock the same at the desired point, a retractile spring connecting said lever with said crank-arm, and a cultivator-gang supported from said frame and embodying ground-wheels between the first-named wheels.

5. The combination of an arched axle, wheels journaled thereon, a cultivator-gang frame pivotally suspended from the axle, ground-wheels for said frame, and cultivating appliances rearward of said ground-wheels.

6. The combination of an arched axle, wheels journaled thereon, a cultivator-gang frame pivotally suspended from the axle rearward of its ends, ground-wheels for said frame, cultivating appliances rearward of said ground-wheels, and means for yieldingly pressing the axle-wheels rearwardly.

In testimony whereof I affix my signature in the presence of two witnesses.

JOHN E. BIELER.

Witnesses:
ERNEST M. SWANSON,
RICHARD H. SWANSON.